Feb. 25, 1964  S. B. WELCH  3,122,626
THERMOSTATIC CONTROL SYSTEM
Filed Nov. 24, 1961
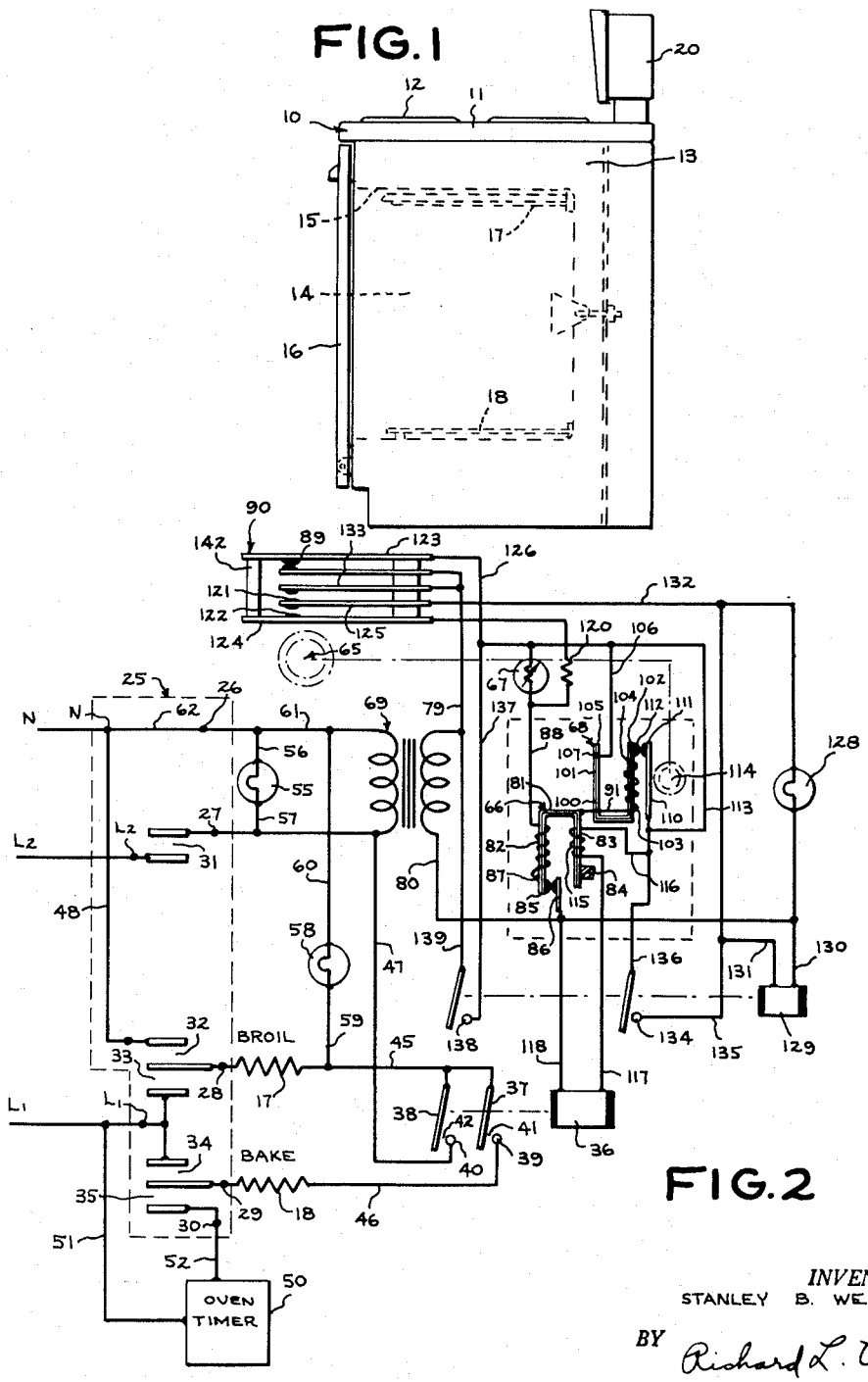
INVENTOR.
STANLEY B. WELCH
BY Richard L. Caslin
HIS ATTORNEY United States Patent Office 3,122,626
Patented Feb. 25, 1964

3,122,626
THERMOSTATIC CONTROL SYSTEM
Stanley B. Welch, Louisville, Ky., assignor to General
Electric Company, a corporation of New York
Filed Nov. 24, 1961, Ser. No. 154,776
8 Claims. (Cl. 219—20)

This invention relates to a temperature controlling system and particularly to an electric thermostat having a single manual control means for obtaining a normal range of temperatures as well as means for shifting the point of control to a higher temperature range.

There is no reason why the use of this invention should be limited to domestic ovens although it has found its greatest utility in controlling a high temperature oven where the oven is operated at both normal cooking temperatures between about 150° F. and 550° and at higher temperatures between about 750° F. and 950° F. for burning off the food soil and grease spatter that accumulates on the walls of the oven liner while cooking is performed within the oven.

One example of such a high temperature automatic heat cleaning oven is described and claimed in the copending application of Bohdan Hurko, Serial No. 27,926, filed May 9, 1960, now abandoned in favor of the continuation-in-part application Serial No. 244,493 filed December 13, 1962, which application is assigned to the General Electric Company, the assignee of the present invention.

Hydraulic thermostats having an elongated bulb or probe formed on the end of an elongated capillary tube that is joined at its opposite end to a bellows or diaphragm within the thermostat housing have been widely used as oven thermostats for many years. An example of a suitable hydraulic type thermostat is disclosed in the United States patent to W. J. Ettinger, No. 2,260,014 dated October 21, 1941. The normal oven cooking temperatures have been between about 150° F. and a maximum of about 550° F., and the thermal responsive fluid used in the hydraulic control systems has been able to withstand this degree of temperature without difficulty, but the known thermally responsive fluids cannot be operated at temperatures much above this value.

This invention contemplates the provision of an electrical thermostatic control system of the type having a variable-resistance temperature sensor of the type that is used quite widely today for the automatic temperature control of surface heating elements of electric ranges. A suitable thermostatic system of this type is taught in the United States patent to Harry I. Baker 2,962,575 which issued on November 29, 1960. Such an electrical thermostatic system as disclosed in the Baker patent is, of course, quite satisfactory for use as an oven thermostat for normal cooking temperatures, but none have been commercially available at a reasonable price to extend over a temperature range that would reach up into the heat cleaning temperatures between 750° F. and 950° F. and still have the necessary degree of accuracy from the minimum to the maximum temperature.

The principal object of the present invention is to provide an accurate electric thermostatic control system which is capable of normal low temperature operations and which may be adjusted to change its control point to a high temperature operation.

A further object of the present invention is to provide an accurate electric thermostatic control system for a domestic oven whereby a single manually operated control means may be used for controlling both normal cooking operations as well as a high temperature heat cleaning operation.

The present invention, in accordance with one form thereof, embodies an electrical thermostatic control system that includes a source of low voltage, a variable-resistance temperature senser for sensing the temperature of a body or an enclosure by virtue of being in heat transfer relation therewith, and a manually settable thermostat that includes a voltage regulating relay so that the senser varies the effective output voltage of the relay in accordance with the sensed temperature regardless of variations in the line voltage. The thermostat includes a responder relay that receives the effective output voltage of the voltage regulator. An output relay is controlled by the responder and this output relay serves as the control means for a source of heat energy whether it be gas or electricity. A resistance means is added to the control circuit to shift the control point of the circuit so that a temperature above the normal cooking temperatures can be attained with accurate results for the complete range of temperatures. Circuit means are also utilized in order to set up the system for the high temperature operation all by means of a single manual control means of the thermostat.

My invention will be better understood from the following description taken in conjunction with the accompanying drawing and its scope will be pointed out in the appended claims.

FIGURE 1 is a right side elevational view of a freestanding electric range embodying the thermostatic control system of the present invention; and FIGURE 2 is a schematic representation of circuitry embodying the principles of the present invention.

Turning now to a consideration of the drawing and in particular to FIGURE 1 there is shown an electric range 10 having a top cooking surface 11 with a plurality of surface heating elements 12. The cooking surface 11 is fastened on a range body or cabinet structure 13 in which is built an oven 14 which is formed by a box-like oven liner 15 and a front-opening door 16. A source of heat must be provided for the oven 14 and it is represented by standard resistance heating elements 17 and 18 within the oven. Heating element 17 is a broiling unit arranged adjacent the top wall of the oven liner, while the other heating element 18 is a baking unit supported near the bottom wall of the oven liner. Both of these heating elements 17 and 18 are connected to lead wires from a source of voltage by means of suitable electrical connectors located in the back wall of the oven liner 15 as will be well understood by those skilled in this art. While only two heating elements have been illustrated, it should be understood that this invention is not limited to a particular number or location of the heating elements, but that it is concerned with the means for controlling the heating elements regardless of their number. For example, an additional heating element in the form of a mullion heater (not shown) might be added to the oven liner adjacent the door opening to compensate for heat loss through and around the door 16. Moreover, the heating elements could be external heaters located on the outside of the oven liner rather than within the oven cavity as is illustrated. The necessary manual selector switches for the surface units 12 and the oven heating elements 17 and 18 are located in a control panel of a backsplasher 20 that is located along the back edge of the cooking surface 11 in a raised position for ready observation and manipulation.

The present invention is concerned with the control of the temperature within the oven cavity 14 and the principles of operation can best be understood with reference to the circuit diagram of FIGURE 2 where both the broil unit 17 and bake unit 18 are shown connected in a power circuit that is supplied from the usual single phase, 236 volt, alternating current, three-wire Edison service entrance commonly found in an adequately-wired residence. The three wires are identified as line wires $L_1$ and $L_2$ and the neutral wire N, it being understood that there is a potential of 236 volts across lines $L_1$ and $L_2$ and 118 volts across either lines $L_1$ or $L_2$ and the neutral wire N. An oven selector switch 25 is interposed between the source of voltage and the heating elements in order to control the amount of power available to convert to heat energy. The oven selector switch 25 has three line terminals identified as N, $L_1$ and $L_2$ to conform to the identification of the wires bringing current to the switch. The selector switch 25 also has a series of load terminals identified as elements 26–30 inclusive. Finally, the selector switch 25 includes a plurality of cooperating contacts 31–35 which are switched in and out of the different circuits for varying the circuitry of the heating elements. A single-throw double-pole output relay 36 is a part of a control circuit, which will be explained in detail hereinafter, for governing the energization of the power circuit for the oven heating elements 17 and 18. This output relay 36 includes a pair of common movable contacts 37 and 38 for cooperation with fixed contacts 39 and 40 respectively to form a pair of single pole switches 41 and 42 respectively. Switch 41 is interposed between the broil unit 17 and the bake unit 18 by leads 45 and 46, while switch 42 is interposed between broil unit 17 and the line wire $L_2$ by means of leads 45, 47, switch terminal 27, switch contacts 31 which are closed during all operating settings of the switch, to line wire $L_2$.

Tracing the various power circuits for the heating elements 17 and 18 there are first to be considered four different circuit combinations or settings in which the heating elements may be combined. These four combinations are Bake, Timed Bake, Broil and Heat Clean.

For a baking operation, the bake unit 18 is operated at rated wattage by connecting it across a potential of 236 volts between lines $L_1$ and $L_2$, while the broil unit 17 is operated at one-fourth rated wattage by a connection across a potential of 118 volts. The bake unit 18 is connected in a circuit from line wire $L_1$, to switch terminal $L_1$, through closed switch contacts 34, through bake unit 18, line 46, through the closed switches 41 and 42 of the output relay 36, through line 47, to switch terminal 27, through closed switch contacts 31, and from the switch terminal $L_2$ to line $L_2$.

Simultaneously, the broil unit 17 is in a circuit from line $L_2$, to switch terminal $L_2$, through closed switch contacts 31, from switch terminal 27, through line 47, and closed relay contacts 38 and 40 forming switch 42, through lead 45, broil unit 17, closed switch contacts 32, to switch terminal N by way of switch conductor 48, to neutral wire N.

In the timed baking cycle only the bake unit 18 is energized, and it is connected across a potential of 236 volts between lines $L_1$ and $L_2$. The completed circuit is from line $L_1$, to switch terminal $L_1$, and through an oven timer 50 by way of leads 51 and 52, to switch terminal 30, through closed switch contacts 35, bake unit 18, lead 46 and relay contacts 37–40 forming switches 41 and 42, through lead 47, to switch terminal 27, then through closed switch contacts 31, switch terminal $L_2$, and finally to line $L_2$.

During the broiling operation, the broil unit 17 alone is energized and it is at rated wattage across a potential of 236 volts between lines $L_1$ and $L_2$. The circuit is from line $L_1$, to line terminal $L_1$, through closed switch contacts 33, broil unit 17, lead 45, switch 42 of output relay 36, lead 47, through switch terminal 27, then through closed switch contacts 31, to switch terminal $L_2$, and then to line $L_2$.

A small oven indicator lamp 55 is connected across line $L_2$ and neutral wire N by way of leads 56 and 57 connected respectively to switch terminals 26 and 27. This lamp 55 is energized whenever the selector switch 25 is activated. A second light 58 is connected in various circuits with the heating elements 17 and 18 so that when the heating elements are cycled on and off by the relay the light 58 will do likewise except when the selector switch is activated in the broil position. The light 58 is connected by leads 59 and 60 from the broil unit 17, to the neutral wire N, by way of a lead 61 joined to switch terminal 26, that is in turn joined by a switch conductor 62 to the switch terminal N, and then to neutral wire N. This signal light 58 is an oven pilot light that is not energized continuously, but only when the heating elements are cycled On by the pulsating control circuit to be described hereinafter. In other words, the oven indicator light 55 is energized whenever the selector switch 25 is activated, while the oven pilot light 58 is only energized when the heating elements are cycled On, thereby visually indicating when the oven temperature has reached the predetermined set temperature of an oven thermostat 65 of the control circuit by the cycling or blinking of the light 58.

The control circuit disclosed in FIGURE 2 of the drawing comprises an electric thermostat 65 of the basic type as disclosed in the Baker Patent No. 2,962,575. The thermostat has a pulsing thermal relay 66 that is controlled by a variable-resistance senser 67, that in turn, controls a responder relay 68, which controls the output relay 36 mentioned earlier as controlling the energization of the heating elements 17 and 18 from a source of voltage. This control circuit has a potential of about 12 volts supplied from the secondary of the step-down transformer 69. Upon the closure of contacts 31 of selector switch 25, an alternating voltage of 118 volts is applied across the primary winding of the transformer so that a reduced-magnitude voltage appears across the secondary winding of that transformer and hence between leads 79 and 80. The senser 67 is preferably a resistor having a high temperature coefficient of resistance and is located within the oven cavity to detect the oven air temperature therein. The senser 67 may be constructed of fine wire such as platinum having a high positive temperature coefficient of resistance or as an alternative a ceramic thermistor element may be used having a high negative temperature coefficient of resistance. It is to be understood that use of a negative coefficient material reverses the action of the thermostat. For purposes of the description of the present invention the senser 67 has a high positive temperature coefficient of resistance.

The line voltage of the three-wire source of electrical energy is subject to substantial variation over different periods of time and accordingly one of the main functions of the pulsing thermal relay 66 is to free the circuit from being voltage sensitive so as to prevent such variations of line voltage from adversely affecting the consistency of operation of the equipment. The voltage regulating relay or voltage regulator 66 is formed as a U-shaped bimetallic or polymetallic blade 81 having a pair of leg portions 82 and 83 that lie substantially in a common plane and extend in spaced parallelism with one another in that plane. One end of leg 83 is fixed as at 84, which is not to be construed as a grounding connection. The free end of the opposite leg 82 is provided with an electrical contact 85 which is normally in a closed contacting relationship with a fixed contact 86. Differential heating of leg portions 82 and 83 is accomplished by heating means in the form of a heater winding 87 coiled around leg portion 82 and electrically connected at one end to the blade while the other end of the winding is series connected with the senser 67 by lead 88. As a result, the heater winding 87 and the senser 67 are connected across the secondary winding of the transformer 69 through a normally closed pair of contacts 89 in a multiple stack switch 90 that is combined with the thermostat 65 for reasons which will be better understood hereinafter.

The bimetal blade 81 of the voltage regulator 66 is formed of U-shape to permit compensation for ambient temperature variations since the effect upon the position of movable contact 85 upon the heating of leg portion 82 is the opposite of that produced by the heating of leg portion 83. Each time the contacts 85 and 86 of the voltage regulator are closed current flows through the heater winding 87 and through the senser 67. The resultant heating of leg portion 82 causes the contact-carrying end of that portion to deflect in a direction to separate contact 85 from contact 86. When these contacts are separated, the energizing circuit for heater winding 87 is interrupted and leg portion 82 commences to cool thereby deflecting in a direction to bring contact 85 into re-engagement with contact 86 so as to re-establish the initial condition. Leg portion 82 continues to deflect in alternate directions with a small-amplitude motion thereby tending to maintain the effective wattage input to the heater winding 87 constant for any given resistance of senser 67. Accordingly, the heater winding 87 will receive energy as a series of pulsations the average or effective voltage of which does not vary as variations occur in the magnitude of the source of voltage. Since the resistance of heater winding 87 is fixed, the effective current through the heater winding and hence through senser 67 will also not vary in magnitude with supply voltage variations. The effective voltage appearing between the bimetal member 81 and a lead 126 and hence between output lead 91 and lead 126 equals the sum of a fixed voltage drop across heater winding 87 and a variable voltage drop across senser 67. Understandably, lead 126 is at the same potential as lead 79 of the secondary of the transformer. The former voltage is determined by the product of the fixed effective current and of the fixed resistance of heater winding 87, and the latter voltage is determined by the product of a fixed current and the variable resistance of senser 67. Therefore, the effective output voltage drop from the voltage regulator 66 appearing between output lead 91 and input lead 126 does not vary with changes in the voltage from the three-wire source of voltage, but does vary directly with the resistance of senser 67.

The responder relay 68 is a U-shaped bimetal member 100 that is similar in construction to the bimetal member 81 of the voltage regulator 66. The purpose of the responder 68 is to integrate the pulsations of energy which are applied to it from the voltage regulator 66 so that it responds only to the effective value of the voltage between conductors 126 and 91. The bimetal member 100 of the responder 68 includes a pair of leg portions 101 and 102 which are arranged in parallel with each other and lying within a single plane. A heater winding 103 is coiled around the leg portion 102 and electrically connected at one end as at 104 to the leg portion 102 and electrically connected at its other end to the output lead 91 of the voltage regulator. The tip of leg portion 101 is anchored as at 105 although this is not to be construed as an electrical ground. The bimetallic blade 100 is connected to a lead 106 as at point 107 and this lead 106 connects the heater winding 103 of the responder in parellel across the senser 67 and the heater winding 87. Accordingly, the bimetal member 100 is at the same potential as the lead 79 of the secondary of the transformer 69.

An adjustable blade 110 is placed in juxtaposition to the leg portion 102 of the bimetal 100 of the responder and an electrical contact 111 at its free end for making and breaking engagement with a contact 112 of the free end of the leg portion 102 of the responder. This adjustable blade 110 has its position determined by a manually adjustable cam member 14 of the electric thermostat 65. Moreover, the adjustable blade 110 includes a permanent magnet (not shown) as part of the contact 111 to provide a spread or differential between the effective voltage at which the contacts 111 and 112 are brought into engagement and the higher voltage at which these contacts are separated. This feature is a standard construction and is not further described here since it is clearly taught in the aforementioned Baker Patent 2,962,575. The adjustable blade 110 is an electrical conductor and it is connected by lead 113 to the same potential as lead 79 of the secondary of the transformer.

This control system acts thermostatically so that when there is an increase in the temperature sensed by the senser 67 it produces an increase in the output voltage between conductors 91 and 79 of a sufficient magnitude to produce separation of responder contacts 111 and 112. These contacts will remain separated until the sensed temperature is lowered sufficiently to drop the effective voltage between conductors 79 and 91 to a value such that contact 112 will approach contact 111 so that the magnetic contact produces a snap closure. The contacts 111 and 112 will remain closed until such time as the sensed temperature again rises to the selected higher value.

The voltage regulating relay 66 is provided with an anticipator winding 115 which is coiled around the leg portion 83 but electrically insulated therefrom. The function of the anticipator winding is to prevent excessive overshoot of the temperature as it approaches the predetermined maximum temperature by reducing the power before the desired temperature is reached. The anticipator winding 115 is connected across the secondary of the transformer in series with the output relay winding 36 by lead 116 that is joined to the adjustable member 110 of the responder and a lead 117 of the output relay 36 and another lead 118 of said relay.

What has been described above of the control circuit of the electric thermostat 65 is more or less the same as is disclosed in the Baker Patent 2,962,575 except for the multiple switch 90 which is built into the thermostat. This structure has been perfected by Baker and others so that such an electric thermostat is accurate for a range of temperatures that covers the normal cooking temperatures of between 150° F. and 550° F. It would result in a very expensive design to extend the principles of the Baker design, while retaining accuracy of operation, to a wider range of temperatures that would include the heat cleaning temperatures of between 750° F. and 950° F.

The present invention may be characterized as dealing with the shifting of the control point of the electric thermostat 65 so that there is in effect two accurate temperature ranges, one covering the normal cooking temperatures between 150° F. and 550° F. and a second range covering the heat cleaning temperatures between 750° F. and 950° F. The preferred manner in which this shift in the control point of the circuit can be effected is by reducing the effective voltage of the senser 67 by placing a shunt resistor 120 across the senser by using the multiple switch 90 that is built into the thermostat 65. This may be done by providing the multiple switch 90 with three sets of contacts, namely, the beforementioned contacts 89 and two other sets of contacts 121 and 122. This multiple switch 90 includes three movable blades 123, 124 and 125. Understandably each blade carries adjacent its free end one electrical contact of each of the three sets of contacts. Contacts 89 are closed when the oven thermostat 65 is set for normal cooking operations and both sets of switch contacts 121 and 122 are opened so that the senser 67 is connected across the secondary of the transformer by way of leads 79, through switch contacts 89, and movable blade 123, and lead 126, senser 67, lead 88, heater winding 87, normally closed contacts 85 and 86 of the voltage regulator, and finally lead 80.

Before explaining the circuits for the high temperature heat cleaning cycle mention will be made of a set-up relay 129 for energizing the control circuit during heat cleaning. The relay is a single throw double pole relay that is connected across the secondary of the transformer by lead 80, lead 130, lead 131, lead 132, through movable switch blade 125, switch contacts 121, fixed blade 133, and back to lead 79 of the transformer. A pilot light 128 is located and connected across the terminals of the set-up relay 129 for indicating when the heat cleaning cycle is operating. It is important to first energize the set-up relay 129 through the switch contacts 121 of the multiple switch 90, but these contacts are designed to be momentary contacts which open as soon as the knob of the thermostat 65 is released after the predetermined maximum heat cleaning temperature has been set on the thermostat. The set-up relay 129 is locked in an energizing circuit through the responder 68 by means of one set of relay contacts 134 which are connected to the relay 129 by lead 135 and connected to the adjustable blade 110 of the responder by lead 136. Accordingly, as the set-up relay 129 is energized the contacts 134 are closed forming a circuit from lead 89 of the transformer, through lead 130, and through the set-up relay 129, lead 131, and 135, through closed switch contacts 134, lead 136, lead 113, to a lead 137 that is connected to a second set of relay contacts 138 which is joined by lead 139 to the other lead of the secondary of the transformer 69.

To explain this in another manner, the oven thermostat 65 is provided with a multiple switch 90 that includes three sets of contacts 89, 121 and 122. For normal cooking operations only switch contacts 89 are closed and the knob of the thermostat would be turned, for example, through an arc of from 0 to 300 angular degrees of rotation in order to obtain the desired range of temperatures from about 150° F. to 550° F. for baking and broiling. Between 300 angular degrees and 330 angular degrees contacts 122 are closed and contacts 89 are opened. At about 325 angular degrees the momentary contacts 121 are closed. It is intended that contacts 121 be closed only momentarily for energizing the set-up relay 129. This action is provided by an insulator 142 which is fastened at one end to the movable blade 123 and bears against the movable blade 124 at its opposite end. Accordingly, as the knob of the thermostat 65 is turned more than 300 angular degrees the movable blade 124 is raised thereby lifting the insulator 142 and opening the switch contacts 89. At the same time switch contacts 122 are closed and further movement between about 325 angular degrees and 330 angular degrees closes switch contacts 121. A spring mechanism (not shown) is provided to return the shaft to about 315 angular degrees measured from a zero datum plane after contacts 121 have closed and the thermostat knob released.

The operation of the heat cleaning cycle is as follows: the oven selector switch 25 is set in the baking position thereby connecting the bake unit 18 at rated wattage across lines $L_1$ and $L_2$, while the broil unit will operate at one-fourth wattage across line $L_2$ and neutral wire N. This also energizes the transformer 89. The knob of the thermostat 65 is then turned from an Off position to a heat cleaning position of about 325 angular degrees and then released, so that the knob returns to about 315 angular degrees. This operation opens switch contacts 89, closes the switch contact 122 and momentarily closes switch contacts 121. The movable blade 125 carries a single contact for each set of contacts 121 and 122. The lead 79 of the transformer is connected to a fixed blade 133 of momentary contacts 121 so that when both sets of contacts 121 and 122 are closed the contacts 122 place the shunt resistor 129 across the thermostat senser 67 with a resistance of about eighty ohms and thereby shift the maximum control point of the circuit from about 600° F. to 800° F. As soon as the momentary contacts 121 are closed, the set-up relay 129 is energized or set thereby closing relay contacts 134 and 138 which in turn energize the thermostat control circuit. Since the oven temperature is below the heat cleaning temperature set by the thermostat, the responder 68 closes to energize the output relay 36. The set-up relay 129 is locked On by the relay contacts 134. The oven heating elements 17 and 18 are energized through the output relay switches 41 and 42 and the oven indicator light 55 and oven pilot light 58 are energized. When the oven air temperature approaches the maximum heat cleaning temperature set by the thermostat the responder 68 opens thereby deenergizing the output relay 36 as well as the oven heating element 17 and trips 18 and the set-up relay 129. As the set-up relay drops out its contact switches 134 and 138 are opened and the oven heating elements remain Off until the thermostat 65 is set to some lower temperature or to another heat cleaning cycle.

Having described above my invention of a novel oven thermostat of the electric resistance type it will be apparent to those skilled in this art that I have devised a single manual control operation for both normal cooking operations and for a high temperature cycle, and that I am able to obtain accurate results in comparative tests made time after time to determine the reliability and operability of this system. While I prefer to change the control point of the thermostat by using a shunt resistor across the senser it will be apparent to those skilled in this art that other resistances can be placed in the circuit as, for instance, in the responder relay to shift this control point although it is believed that these modifications would result in an increased cost over the preferred embodiment. Also, it is apparent that the multiple switch 90 could be made separate from the thermostat 65. However, the combination of the switch with the thermostat makes for a very convenient and low cost design.

Other modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. An electrical thermostatic control system for controlling the temperature of a body, electric heating elements connected to a source of voltage for supplying heat to said body, selector means for establishing various high voltage power circuits for the heating elements, a low voltage thermostatic control circuit fed from said source of voltage for controlling the energization of the high voltage power circuits, said control circuit comprising a variable-resistance temperature senser for sensing the temperature of said body, a pulsing voltage regulating relay in series with the senser so that the senser varies the effective output voltage of said relay in accordance with the sensed temperature of the body, a responder relay receiving the effective output voltage of the voltage regulating relay, and an output relay controlled by the responder relay for controlling the energization of the heater circuits; the invention comprising a resistance shunt and control means for placing the resistance across the variable-resistance temperature senser to increase the temperature range of the senser for work with above-normal temperatures, said control means for the shunt resistor being a set-up relay having one set of contacts for energizing the low voltage control circuit while the other set of contacts locks the relay in the closed position, the responder relay opening the circuit for the set-up relay when the temperature of the body reaches a predetermined maximum temperature.

2. An electrical thermostatic control system for controlling the temperature of matter within a given area, said system comprising a source of power and means for converting this power to heat energy, selector means for determining various levels of power output, a low voltage thermostatic control circuit for controlling the activation of the source of heat energy, said control circuit comprising a variable-resistance temperature senser in close proximity to the matter whose temperature is to be governed, a voltage regulating relay in series with the senser so that the senser varies the effective output voltage of said relay in accordance with the sensed temperature of the matter, a responder relay having the output energy from the voltage regulating relay applied thereto, and an output relay controlled by the responder relay for governing the activation of the source of heat energy; the invention comprising a shunt resistor and relay means for energizing the thermostatic control circuit with the shunt resistor across the temperature sensor whereby the maximum control point of the control system has been increased, the last mentioned relay means being energized through the responder relay so that when the maximum predetermined temperature is reached the responder de-energizes the last mentioned relay for opening the control circuit and de-activating the source of heat energy.

3. An electric oven comprising an oven cavity, electric heating elements in heat transmitting relation to the oven cavity, a source of voltage connected to the heating elements, selector means for arranging the heating elements in various circuits of different wattages, and a low voltage thermostatic controlled circuit supplied from said source of voltage for controlling the energization of the heating elements, said control circuit comprising a variable, resistance temperature sensor for sensing the temperature of the oven air, a pulsing voltage regulator in series with the sensor so that the senser varies the effective output voltage of the voltage relay in accordance with the sensed temperature within the oven cavity, a responder relay receiving the effective output voltage of the voltage regulator, and an output relay controlled by the responder relay for controlling the energization of the heating elements; the invention comprising a shunt resistor and relay means for energizing the control circuit and connecting the shunt resistor across the temperature senser, said relay means being energized through the responder relay, so that when the oven air temperature reaches a maximum predetermined temperature the responder relay will open thereby deenergizing the relay means and thereby de-energizing the heating elements.

4. An electric oven as recited in claim 3 wherein the low voltage thermostatic control circuit has a single manual control which is capable of controlling the heating elements during normal cooking operations of between about 150° F. and 550° F., while also being able to shift the control point of the thermostatic circuit so that the oven air temperature can be raised to a heat cleaning temperature between about 750° F. and 950° F. for burning off the food soil that accumulates on the interior of the oven.

5. An electrical thermostatic control system for controlling the temperature of an enclosure, a source of heat energy for the enclosure, and a low voltage thermostatic control circuit fed from said source of voltage for controlling the output of the sources of heat energy, said control circuit comprising a variable-resistance temperature senser for sensing the temperature within said enclosure, a voltage regulating relay connected to the senser so that the senser varies the effective output voltage of said relay in accordance with the sensed temperature of the enclosure, a responder relay receiving the effective output voltage of the voltage regulator, and an output relay controlled by the responder relay for controlling the output of the heating source; the invention comprising a resistor means connected in the circuit for changing the control point of the senser to obtain a normal temperature scale without the resistor means and a high temperature scale when the resistor means is connected in the circuit, said resistor means being a shunt resistor that is placed across the temperature senser, and a set-up relay energized through the responder relay for completing the high temperature circuit so that when a maximum high temperature is reached and the responder relay is opened the set-up relay will drop out and deenergize the circuit.

6. A domestic oven having an electrical thermostatic control system comprising a relatively low voltage control circuit with a variable-temperature senser having a high temperature coefficient of resistance, a pulsing thermal relay, the temperature senser being utilized to vary the effective output voltage of the pulsing thermal relay in accordance with the sensed temperature of a body whose temperature is to be controlled, a responder relay to which the output energy from the pulsing relay is applied, the responder being subject to the effective value of the applied voltage rather than to the individual pulsations, and an output relay controlled by the responder, heater means in a separate relatively high voltage circuit, the output relay controlling the energization of said high voltage circuit, a resistance shunt for connection across the temperature senser, and circuit control means for placing the resistance across the sensor and energizing the control circuit so as to shift the control point of the thermostatic system to a much higher temperature, said oven being designed to have an automatic heat cleaning cycle in a temperature range above normal cooking temperatures, the shunt resistance being used in a circuit when the oven temperatures are to be raised above the normal cooking temperatures of about 550° F. to a temperature between 750° and 950° F.

7. In a household cooking oven including heat-insulated structure defining a cooking cavity therein having a front opening, a heat-insulated front door operatively associated with said front opening and selectively movable between open and closed positions with respect thereto, a source of electric power supply, and a heating circuit adapted to be completed to said power source to supply heat into said cooking cavity; the combination comprising a selector switch having an Off position and an On position, said selector switch in its Off position interrupting said heating circuit, said selector switch in its On position preparing said heating circuit, a manually settable temperature control device having a variable bake position and a heat-clean position, said temperature control device in its variable bake position correspondingly presetting a variable bake temperature for said cooking cavity in the normal cooking temperature range extending from about 150° F. to about 550° F., said temperature control device in its heat-clean position presetting a given heat-cleaning temperature for said cooking cavity in the heat-cleaning temperature range extending from about 750° F. to about 950° F., a temperature sensing resistor operatively associated with said cooking cavity and responsive to the temperature therein, a circuit network operatively connected to said temperature control device and to said temperature sensing resistor and governed jointly by the temperature preset by said temperature control device and by the temperature sensed by said temperature sensing resistor, said circuit network having a first setting in which it is matched to the response of said temperature sensing resistor in said normal cooking temperature range and a second setting in which it is matched to the response of said temperature sensing resistor in said heat-cleaning temperature range, means responsive to operation of said temperature control device into its bake position for operating said circuit network into its first setting and responsive to operation of said temperature control device into its heat-clean position for operating said circuit network into its second setting, switching mechanism operative to open and to close said prepared heating circuit, and means controlled by said circuit network for selectively operating said switching mechanism, wherein said switching mechanism is operated to close said prepared heating circuit when the temperature of said cooking cavity sensed by said temperature sensing resistor is below that preset by said temperature control device and to open said prepared heating circuit when the temperature of said cooking cavity sensed by said temperature sensing resistor is above that preset by said temperature control device.

8. The household cooking oven set forth in claim 7, and further comprising lockout mechanism having a trip position and a set position, said lockout mechanism in its trip position accommodating repeated operation of said switching mechanism between its closed and open positions and in its set position preventing reoperation of said switching mechanism into its closed position following the first operation thereof from its closed position into its open position, and means responsive to operation of said temperature control device into its heat-clean position for actuating said lockout mechanism into its set position and responsive to subsequent operation of said temperature control device into its bake position for actuating said lockout mechanism into its trip position.

References Cited in the file of this patent

UNITED STATES PATENTS

| | | |
|---|---|---|
| 2,236,624 | Littwin | Apr. 1, 1941 |
| 2,898,436 | Lawler | Aug. 4, 1959 |
| 2,962,575 | Baker | Nov. 29, 1960 |